United States Patent [19]

Balogh et al.

[11] 4,238,790

[45] Dec. 9, 1980

[54] SOWING MONITORING ARRANGEMENT

[75] Inventors: Barnabás Balogh; József Erdélyi; Zsolt Fábián; Vazul Rusz, all of Budapest; Mihály Samu; József Szente, both of Gödöllő, all of Hungary

[73] Assignee: Mazögazdasági Gépkisérleti Intézet, Gödöllo, Hungary

[21] Appl. No.: 925,996

[22] Filed: Jul. 19, 1978

[51] Int. Cl.³ ............................................. G08B 21/00
[52] U.S. Cl. ..................................... 340/684; 340/524
[58] Field of Search ........................ 340/684, 524, 679

[56] References Cited

U.S. PATENT DOCUMENTS

| | | | |
|---|---|---|---|
| 4,079,362 | 3/1978 | Grimm et al. | 340/684 |
| 4,100,538 | 7/1978 | Knepler | 340/684 |

*Primary Examiner*—Glen R. Swan, III

[57] ABSTRACT

A monitoring arrangement comprises units for sensing the flow of seeds through each coulter of a sowing machine and indicating units installed on a part of the machine where the coulters are supported. A common, central unit to indicate an interruption occurring in any coulter is also provided, acting via a common electric conduit that feeds signals from the indicating units to the central unit. The invention suggests one indicating unit for a maximum of three sensing units but preferably the number of the indicating units is half that of the sensing units while the number of the latter is identical with that of the coulters. The arrangement may further include a unit for counting fault locations, connected to the indicating units by the common conduit. At least some of the sensing units may be in the form of piezoelectric sensors that respond to the impingement of the seeds within the coulters. The sensing units are preferably installed within and near the lower ends of the coulters, substantially at soil level when the sowing machine is operated.

5 Claims, 3 Drawing Figures

SOWING MONITORING ARRANGEMENT

BACKGROUND OF THE INVENTION

The invention relates to monitoring arrangements for sowing machines, particularly for row drills having a large number of rows or coulters.

It is well known that in agriculture one of the determinants of the yield is the quality of the sowing. In large-scale agricultural operations seeding machines or row drills are now being widely used that have a large number of rows or positions so as to increase productivity. For grain sowing machines, the number of coulters sometimes exceeds 140. If therefore serious production losses are to be avoided one has to become promptly aware of any blocking of the coulters, including the circumstance that the seed should run out from the seed box.

Various devices became known for monitoring the operation of sowing machines, mainly for machines having a small number of rows or positions (max. 16 coulters), aiming at automatically indicating to the tractor driver if there is a sowing irregularity. The driver eliminates the disturbance and then proceeds with the sowing. It is a common characteristic of these devices that the coulters are provided with a photocell-operated unit that senses the interruption in sowing. The seed leaves the coulters upon having interrupted the light beam of the photocell. In the sensing units, pulse sequences are produced that have a frequency corresponding to the seed flow. When the flow is interrupted, that is in the event of a sowing disturbance, the pulse sequence is interrupted. Separate lines or conductors are provided to link the individual sensing units of the coulters to an electronic fault-location indicating unit that is disposed within the field of vision of the tractor driver. In such arrangements the electronic unit gives an indication of the location and possibly the number of the disturbed coulters by the intermediary of illuminated signal lamps when the pulse sequence of the sensing unit(s) is interrupted. Such a solution is known for example from the U.S. Pat. No. 3,723,989, and the commercially known VEK-6 and -8 sowing monitoring arrangements are basically of the same principle.

The indication of the faulty location is consequently provided with these solutions in a central unit, by the intermediary of the positional numbers of the coulters that are involved. These devices being almost exclusively adapted to seeding machines that have a relatively low number of rows or coulters (6, 8 or 12) it is usually not difficult for the driver to memorize the number of the faulty coulter.

As mentioned above, there are as many lines or conductors for carrying information from the sensing units of the coulters as there are coulters, providing individual information at the central unit. Such wires or lines can be bundled into a multi-line cable or into a composite conductor. With a small number of coulters there are no particular difficulties in leading the lines from the seeding machine to the driver's seat, and the performance of the arrangement is not essentially influenced.

If however the known solutions are to be used for seeding machines having a high number of rows (such as 48), we are facing serious difficulties. One of them is that the tractor driver has to memorize one or more position numbers for the faulty coulters so that difficulties may be encountered in selecting the non-operating coulter, which may require re-checking, and may become rather time consuming. A further disadvantage resides in that a substantial amount of cable becomes necessary which, besides the initial expenditures, seriously impairs the operational reliability of the operating machine unit. This is further compounded by the fact that the arrangement becomes rather expensive on account of the use of opto-electronic sensing units and the substantial number of indicating lights, furthermore involving substantial electric energy consumption. On account of the enumerated deficiencies and difficulties the sowing monitoring of multi-row machines has not been solved so far.

SUMMARY OF THE INVENTION

It is one of the primary objects of the present invention to provide a monitoring arrangement for row drills or seeding machines that have a large number of positions, eliminating at the same time the deficiencies of the known arrangements.

It is a further object to provide a reliable solution with which the work of the tractor driver can be alleviated without increasing expenditures.

It is a basic consideration for the present invention that the objects can be solved by applying locally disposed fault indicators for the coulters, while using a central indicating unit merely to signal the existence of a disturbance.

In accordance with major features of the invention, the monitoring arrangement for sowing machines has sensing units for each coulter to which the seed is being fed, the invention providing indicating units on a part of the sowing machine where the coulters themselves are supported, a common, single electric conduit being provided that feeds signals from the indicating units to a common, central unit that merely indicates interruptions that may occur in any of the coulters.

The invention also provides an optional unit for counting the fault locations, which can be associated with the common, central unit, and is also connected to the indicating units by the common conduit.

In accordance with the invention, at least some of the sensing units can be provided in the form of piezoelectric sensors that respond to the impingement of the seed within the coulters. No supply voltage is required for them, they do not require any noteworthy upkeep, and allow a relatively simple and inexpensive structural solution. The sensing units may be installed within and near the lower ends of the coulters, substantially at soil level when the sowing machine is operated.

It is sufficient for the invention to provide one indicating unit for a maximum of three sensing units; however the number of the indicating units is preferably half that of the sensing units while the number of the latter is identical with that of the coulters.

BRIEF DESCRIPTION OF THE DRAWINGS

Other objects, features and advantages of the inventive arrangement will become better understood when considering the same upon perusal of the following description, read in conjunction with the accompanying drawings, wherein.

DESCRIPTION OF THE PREFERRED EMBODIMENT

Figure 1:
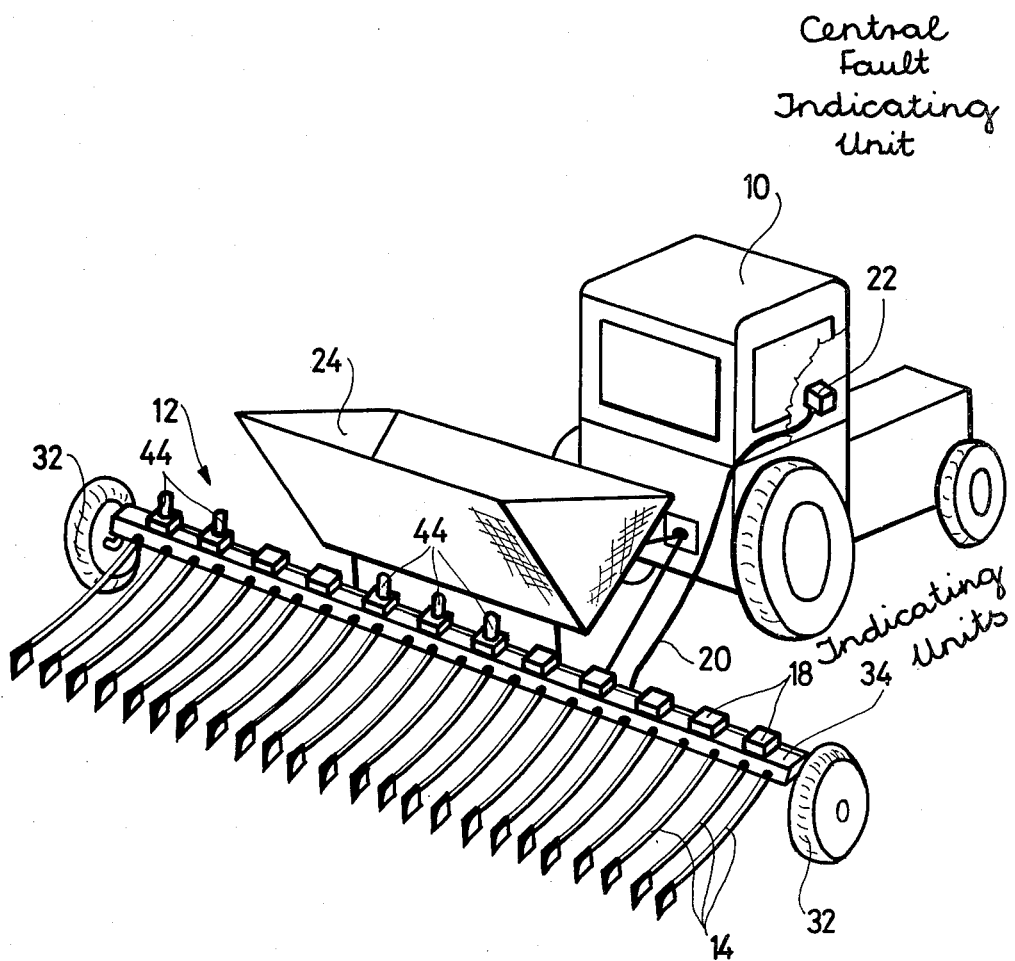
FIG. 1 is a somewhat schematic perspective view of a row drill or seeding machine attached to a tractor and having thereon a preferred, exemplary embodiment of the inventive sowing monitoring arrangement.

It can be seen in FIG. 1 that the inventive sowing monitoring arrangement is applied to a row drill or seeding machine 12 which is attached to, in a known manner, and entrained by a tractor 10 and the like prime mover. The machine has, in this example, twentyfour coulters or fins 14, and it should be noted that the inventive arrangement is particularly suitable for row drills having a large number of such coulters.

Figure 2:
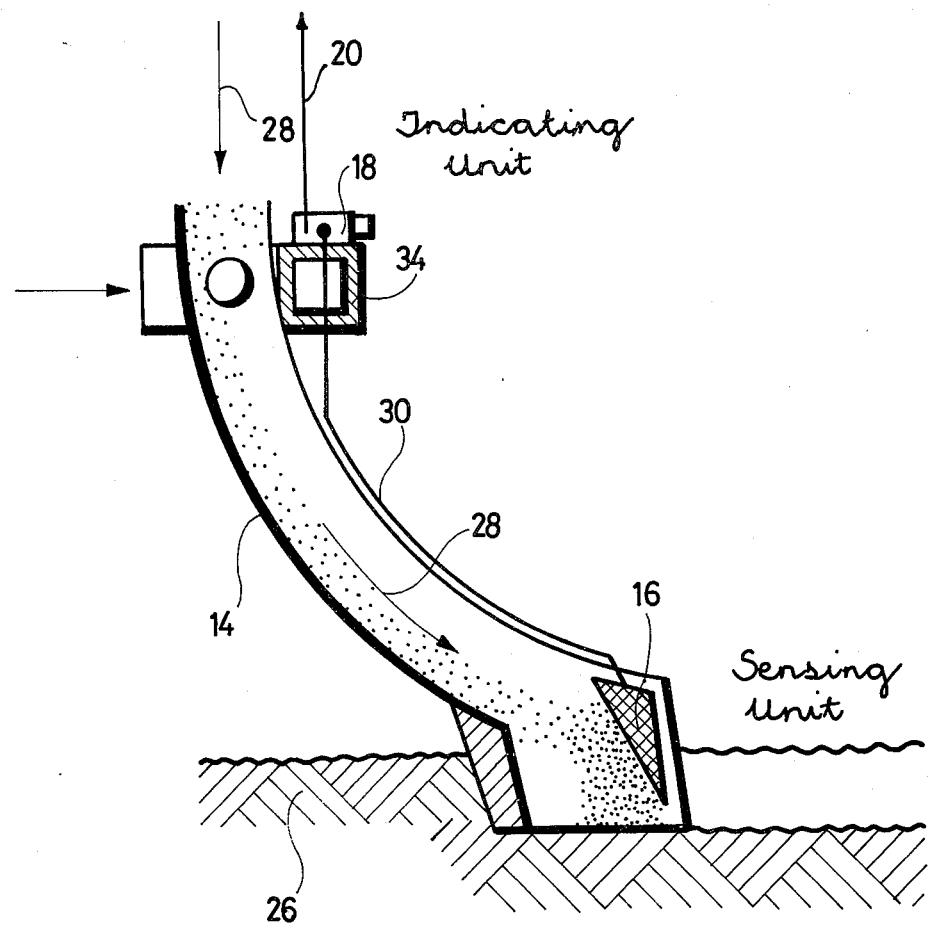
FIG. 2 is a similarly schematic, vertical sectional view, taken through one of the coulters of the row drill, and associated parts of the inventive arrangement.

Each coulter 14 has electrically connected thereto a unit 16 for sensing the skipping or absence of seeds, that is the interruption of seed flow (for a better understanding, refer to FIG. 2 where the direction of gravitational seed flow through each coulter 14 is indicated by numeral 28 at two locations). Each of the units 16 (or pairs of them, as will be explained) has associated therewith a known unit 18 for indicating the location of actual skipping or disturbance, the electrical connection being shown in FIG. 2 with an individual electric conduit 30 between each pair of the units 16, 18, being also identified in the more detailed schematic of FIG. 3.

In accordance with the invention, each indicating unit 18 is preferably disposed in the proximity of or above the respective coulter 14, a common multi-core electric conduit 20 leading from all of the units 18 to the tractor 10 where a central unit 22 is disposed for fault indication. A customary seed box 24 is also shown in FIG. 1, from which the coulters 14 are fed in a usual manner.

The vertical sectional view of FIG. 2 through any one of the coulters 14 further illustrates the preferred inventive arrangement. The soil into which the coulters protrude, in a conventional manner, during the sowing operation of the machine, is identified by numeral 26. It is shown in this illustration that the sensing units 16 are preferably disposed toward the lower ends of the respective coulters 14, at about the soil level, while the indicating units 18 are preferably carried by a transversal beam 34 of the machine, to which customary runners 32 are rotatably attached (see FIG. 1). The individual electric conduits 30 between the units 16, 18 have been mentioned earlier.

In accordance with a feature of the invention, at least some of the units 16 for sensing the interruption of the seed flow are in the form of known piezoelectric sensors, hence their preferred positioning toward the lower ends of the coulters 14 where the seed flow (28) can impinge on these sensors, an electric signal (or sequence of signals) being produced when seed flow is normal (however a reversal of the electric pulse supply would also be possible).

Figure 3:
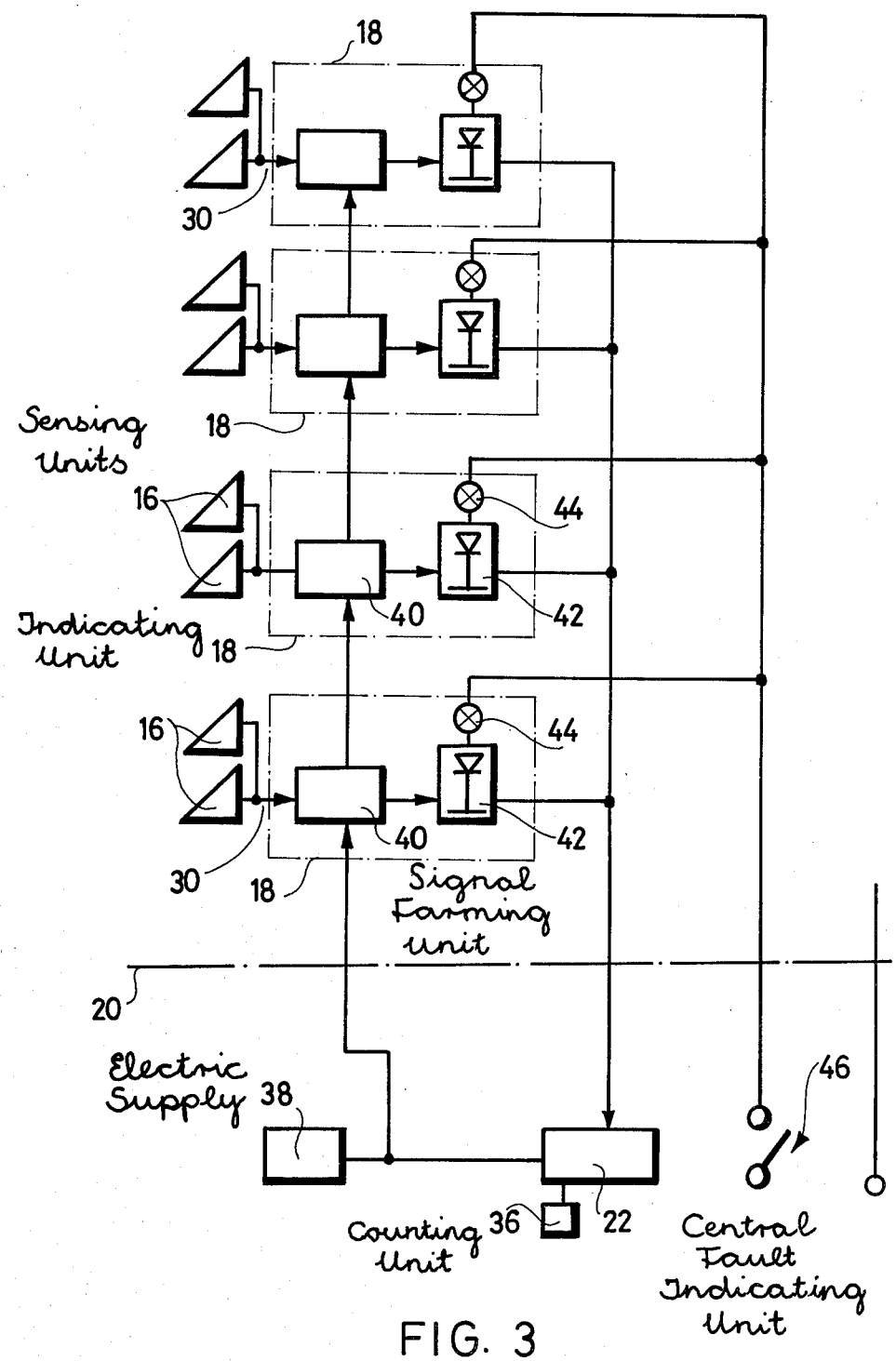
FIG. 3 is a schematic electric circuit diagram of the inventive sowing monitoring arrangement, showing as a matter of example circuit elements associated with eight of the coulters of the machine (having four electric indicating units).

For purposes of convenience, as can be seen from FIG. 3, two adjacent sensing units 16 may be linked to a common one of the afore-mentioned indicating unit 18, thereby reducing the requirement for the subsequent electronic parts. It would however be entirely possible to use as many units 18 as there are units 16 (=the number of coulters 14), or, as a matter of example, only one unit 18 for three (or possibly more) of the sensing units 16. In accordance with the set-up used in the exemplary, preferred embodiment of the sowing monitoring arrangement, there are consequently twelve indicating units 18 (see FIG. 1) for the twentyfour coulters 14. In FIG. 3, only four units 18 are shown for a total of eight units 16, the others being omitted for the sake of easier illustration.

The earlier-mentioned common electric conduit 20 leads from the units 18 (see FIG. 3) to the central fault-indicating unit 22. As a matter of example, a four-core conduit can be used at 20 (including the three vertical wires shown in FIG. 3 as well as a fourth, common return wire or pole for the electric circuit). The central fault-indicating unit 22 is provided within the field of vision of the tractor driver, serving as a general indication of the skipping or absence of seeds in any coulter 14, without any specific indication of the location or of the coulter(s) 14 that is (are) affected.

In accordance with the invention, the central unit 22 may have electrically connected thereto a unit 36 for counting fault locations, depending on the number of signals that are being conveyed from the units 18 to the central unit 22. This feature allows the driver to judge whether a single, possibly negligible fault is present at a single coulter, or possibly the sowing is interrupted at various locations, requiring immediate stoppage of the seeding machine and remedial action.

Above the dot-dash line 20, denoting the common conduit in FIG. 3, those units and electric components are shown that are located on the row drill itself (mostly on the beam 34), while the common, centralized units are below the line 20, including the already mentioned units 22, 36. A common unit 38 for providing electric supply to the arrangement also forms part of the invention, possibly electrically connected to or even fed by the electric system of the tractor.

Each indicating unit 18 (linked with the respective conduits 30 to two of the sensing units 16, in the present example) includes a signal forming unit 40 that is preferably driven by a respective thyristor 42. The latter is connected, on the one hand, to the central unit 22 and, on the other, to an individual indicator lamp 44. Common points of all lamps go to a conventional main switch 46 of which the connection to the supply unit 38 (and the earlier-mentioned common return wire of conduit 20) are not further illustrated but will be understood by those skilled in the art. The switch will be further explained somewhat later.

The operation of the inventive sowing monitoring arrangement is as follows. During sowing, the seed drops from the box 24 into each of the coulters or fins 14 where gravitational flow (along the arrows 28) makes the seed impinge upon or hit the (preferably piezoelectric) sensing units 16. A sequence of electric pulses is produced in a known manner by each unit 16, suitable for fault indication if seeds were skipped in one or more of the coulters 14. The unit 18 that is fed by the respective unit 16 would then pass a pulse to the respective thyristor 42 which thus becomes conductive, for subsequent fault indication, as will be seen. The thyristor delivers a pulse to the central fault-indication unit 22 (and possibly to the optional unit 36 that counts fault locations). The driver is thus given an indication of faulty sowing and, if the unit 36 is also provided, a count of the locations (coulters 14) at which the seeds have been skipped so that the resulting seeding would be irregular. The faults may be due to uneven distribution of the seed in the box 24, or to some blockage in one or more of the coulters 14.

While this is in progress, the switch 46 should be in its open position so that the lamps 44 are not yet illuminated. Once the driver notices the disturbance, he closes the switch 46 and stops the tractor 10. The wire in the common electric conduit 20 that is fed by the switch 46 allows all the lamps 44 to be lit (if energized, at their other poles, by the respective thyristor(s)), which belong to the affected indicating units 18. This of course allows the driver to ascertain the locations (respective sensing units 16) at which seed flows has been interrupted. The indication persists until the switch 46 is opened again, namely after having eliminated the disturbance and restarted the tractor. This interruption simultaneously zeroes and de-activates all the units 18, the central unit 22, and the optional unit 36.

The sowing monitoring arrangement according to the present invention can be used for row drills having any number of positions or coulters. It is considered to be a particular advantage of the arrangement that the driver merely has to sense or notice the fact of a disturbance, shown by the central unit 22, while the indicating units 18 are disposed in the areas of the associated coulters 14, and a single common electric conduit 20 relays the units 18 to the central unit 22. Once the tractor has been stopped and the driver approaches the row of indicating units 18 that have the lamps 44 mounted thereat, in the areas of the coulters 14 (some have been omitted from FIG. 1 for the sake of clarity), there is no need to memorize the fault locations. The localized indication greatly facilitates the finding of the fault(s) and the removal of any disturbance in the machine, even in case of nightly sowing operations.

The use of a common electric conduit 20 (with only four wires or conductors) makes for substantial savings in initial expenditures and in maintenance costs, contributing at the same time to a fault-free operation of the inventive arrangement.

As mentioned before, the common conduit 20 preferably includes four wires, as schematically shown in FIG. 3 (including the common return wire). The lamps 44 are switched on only just before the tractor or prime mover is being stopped. Consequently the lamps are not burning when the tractor and the seeding machine are in motion, when the lamps are subject to vibrations that shorten their life span.

It will be understood by those skilled in the art that the "boxes" schematically illustrating the units 16, 18, 22, 36, 38 and 40 are well known and constitute "electronic building blocks" in various known circuits. Their interconnections are shown, so far as required for the present invention, so that the omitted details will not detract from the full understanding of the inventive features of this application.

It will also be clear that several modification in, additions to, or minor omissions from, the exemplary embodiment are possible, without departing from the spirit and scope of the invention, as will be understood by those skilled in the art.

The embodiments of the invention in which an exclusive property or priviledge is claimed are defined as follows:

1. A monitoring arrangement for sowing machines that include a row of coulters pivotally supported to introduce seeds into the soil when the machine is entrained by a tractor and the like; the arrangement comprising units for sensing flow of the seeds through each of said coulters; indicating units, installed on a part of the sowing machine where said coulters are supported, responsive to interruption of the seed flow, as evidenced by signals fed from said sensing units to said indicating units, there being one of the latter for a maximum of three of said sensing units; a common, central unit for indicating an interruption occurring in any of said coulters; and a common electric conduit that feeds signals from said indicating units to said central unit.

2. The monitoring arrangement as defined in claim 1, further comprising a unit for counting fault locations, connected to said indicating units by said common conduit.

3. The monitoring arrangement as defined in claim 1, wherein the numbers of said indicating units is half that of said sensing units while the number of the latter is identical with that of said coulters.

4. The monitoring arrangement as defined in claim 1, wherein at least some of said sensing units are in the form of piezoelectric sensors that respond to impingement of the seeds within said coulters.

5. The monitoring arrangement as defined in claim 4, wherein said sensing units are installed within and near lower ends of said coulters, substantially at soil level when the sowing machine is operated.

* * * * *